June 28, 1966  C. H. WORSHAM ETAL  3,258,364
METHOD FOR INCREASING EFFECTIVE ELECTRODE-ELECTROLYTE
CONTACT AREA IN FUEL CELLS
Filed June 21, 1962
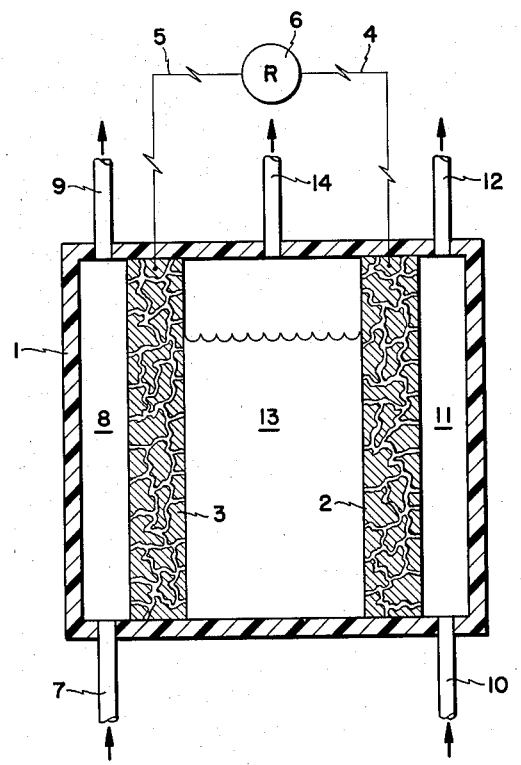
CHARLES H. WORSHAM  INVENTORS
EDWARD J. WICKSON
BY *Olin B. Johnson*
PATENT ATTORNEY United States Patent Office 3,258,364
Patented June 28, 1966

3,258,364
METHOD FOR INCREASING EFFECTIVE ELECTRODE-ELECTROLYTE CONTACT AREA IN FUEL CELLS
Charles H. Worsham, Fanwood, and Edward J. Wickson, Scotch Plains, N.J., assignors to Esso Research and Engineering Company, a corporation of Delaware
Filed June 21, 1962, Ser. No. 204,134
10 Claims. (Cl. 136—86)

This invention relates to new and useful improvements in the direct production of electrical energy from gaseous fuels. In particular, this invention relates to improvements in electromechanical conversion of chemical energy in a fuel cell employing an aqueous electrolyte and a gaseous fuel. More particularly, this invention relates to employing small amounts of surface-active agents in an aqueous fuel cell electrolyte and to the operation of fuel cells with such electrolyte and a gaseous hydrocarbon fuel.

The term "fuel cell" is used herein and in the art to denote a device, system or apparatus wherein chemical energy of a fluid combustible fuel, e.g. hydrogen, carbon monoxide, a hydrocarbon or a substituted hydrocarbon containing hydrogen in its molecular structure, is electrochemically converted to yield electrical energy at a non-sacrificial or inert electrode. The true fuel cell is adapted for continuous operation and is supplied with both fuel and oxidant from sources outside the cell proper. Such cells include at least two nonsacrificial or inert electrodes, functioning as an anode and cathode respectively, which are separated by an electrolyte which provides ionic conductance therebetween, conduction means for electrical connection between such anode and cathode external to such electrolyte, means for admitting a fluid fuel into dual contact with the anode and electrolyte and means for admitting a fluid oxidant into dual contact with the cathode and electrolyte. Where necessary or desired, the electrolyte compartment is divided into an anolyte compartment and a catholyte compartment by an ion-permeable partition or ion-exchange membrane. Thus, in each such cell, a fluid fuel is passed to the anode and there oxidized electrochemically, giving up electrons to the anode, while a fluid oxidant is passed to the cathode and there reduced upon receiving electrons from such cathode. Since the voltage developed by an individual cell is low, it is usually preferable to employ relatively small cells and to electrically connect large numbers of such cells in series or in both series and parallel.

The fuel cell, although potentially the most simple way of converting chemical energy to electrical energy, has developed slowly. A number of technical problems remain to be solved before a practical fuel cell suitable for general use is available. This invention relates to one of such problems, i.e. the problem of increasing the effective reaction area of an electrode above the mean upper level of an aqueous electrolyte so as to increase the efficiency of cells employing a gaseous fuel and/or oxidant.

In cells employing a liquid electrolyte and a gaseous reactant, the effective reaction area of the given half cell is limited to the common meeting place or three-phase contact established between such reactant, electrolyte and the solid conductor or electrode.

It has now been discovered that the volume efficiency of such cells is greatly improved by employing small quantities of certain surface-active agents, hereinafter sometimes termed "surfactants," in the aqueous electrolyte.

It is quite surprising that surfactants can increase the area of the solid-liquid-gas contact and hence the potential area of reaction. The primary area of reaction on the electrode surface has been considered to be substantially coextensive with the area covered by the meniscus. The height of the meniscus is obtained by the equation $$h^2 = \frac{2\sigma}{\rho g}(1-\sin \alpha)$$

where $\sigma$ is the surface tension of the liquid, $\rho$ is the density of the liquid, $g$ is the gravity constant, and $\alpha$ is the contact angle.

For an aqueous electrolyte against a clean metallic electrode, $\alpha$ is ordinarily zero, so that $$h^2 = \frac{2\sigma}{\rho g}$$

Surface-active agents invariably lower the surface tension of aqueous solutions, i.e. decrease $\sigma$. Therefore, they would be expected to decrease the area in which reaction occurs at effective rates.

Furthermore, insertion of the highest reasonable values of $\sigma$ and $\rho$ into the equation last-above stated yields a value for $h$ of less than 4 mm., whereas the observed values for the useful heights while operating in accordance with this invention are considerably larger than this. This demonstrates that when surfactants are employed in the electrolyte in accordance with this invention the area of reaction is extended considerably beyond the end of the meniscus and that the surfactant is advantageously affecting the electrochemical activity in this region by some mechanism, the nature of which is not understood.

Consideration should be given to selecting a surfactant that is compatible with the chosen electrolyte and the catalyst system in use. The surfactant employed should be relatively chemically stable in the electrolyte and preferably is electrochemically active upon contact with the fuel electrode although less reactive than the primary fuel. This allows the electrode to cleanse itself if the surfactant intervenes between the fuel and the reaction sites on the electrode surface.

In accordance with this invention the surface-active agent employed in the electrolyte solution can be either nonionic, cationic, anionic, or, if desired, a combination of two or more of the same. Of these the nonionic surfactants are preferred.

The aforementioned general types of surfactants can be further subdivided into groups in accordance with their general chemical characteristics. The more common representatives of the groups are included in the following list.

ANION-ACTIVE SURFACE ACTIVE AGENTS

Alkyl aryl sulfonates and phosphonates
Alkyl sulfates and phosphates
Sulfated and sulfonated amides and amines
Sulfated and sulfonated esters and ethers
Alkyl sulfonates and phosphonates

CATION-ACTIVE SURFACE ACTIVE AGENTS

Salts of simple primary or tertiary amines
Quaternary ammonium salts
Salts and quaternary derivatives of amino amides
Alkyl amine oxides
Salts and quaternary derivatives of imidazolines
Salts and quaternary derivatives of amino esters

NONIONIC CONDENSATES

Fatty acid esters
Ester-ethers
Fatty alcohol ethers
Alkyl aryl polyglycol ethers
Ethoxylated fatty amides The foregoing lists are illustrative but not exhaustive. Other suitable surfactants are commercially available.

Among these are the fluorocarbon surfactants which may take the form of one of the aforenamed surfactant groups with fluorine substitution for hydrogen atoms in the lipophilic portion of the molecule.

Representative nonionic surfactants for use in this invention include those represented by the following type formulas:

$$RO(CH_2CH_2O)_nH$$
$$RR'O(CH_2CH_2O)_nH$$
$$RR'CH_2O(CH_2CH_2O)_nH$$
$$RO(CH(CH_3)CH_2O)_n(CH_2CH_2O)_mH$$

wherein R represents an alkyl radical, R' a phenylene radical and $n$ and $m$ are positive numbers, the value of $n$ and $m$ and the number of carbon atoms in R providing a balance in conformance with the general requirements for the surfactant hereinbefore set forth.

When nonionic surfactants are employed it is preferred to employ a compound having an HLB value in the range of about 4 to 8. Solubility characteristics of a surfactant are dependent upon the existing balance between the lipophilic portion of the molecule, e.g. hydrocarbon radical, and the hydrophilic portion, e.g. ethylene oxide groups. A measure of this balance recognized in the art is the HLB value. The specific system of calculating HLB value employed herein is set forth in "Interfacial Phenomena," J. T. Davies and E. K. Rideal, Academic Press, 111 Fifth Avenue, New York 3, New York (1961), at page 372, which is to be considered incorporated herein by reference.

Cationic surfactants which may be used include those having an HLB value in the range of about 0.6 to about 16.3. These are illustrated by the following compounds:

$$C_{12}H_{25}(CH_3)_2NO$$
$$(C_{12}H_{25})_2CH_3NO$$
$$(C_{12}H_{25})_3NO$$

Anionic surfactants which may be used include those having an HLB value in the range of about 9.4 to 44.5. These are illustrated by the following compounds:

$$C_{13}H_{27}(-OCH_2CH_2)_nSO_4^-M^+$$
$$C_{30}H_{61}SO_4^-M^+$$

and $$RR'SO_3^-M^+$$

where $n$ is zero or a positive number in the range of about 1 to 15, M is hydrogen or other cation, e.g. Na, K, etc., R is an alkyl radical containing 2 to 12 carbon atoms per molecule and R' is a phenylene radical.

It should be understood that although the foregoing surfactants will increase the reaction area, certain surfactans will adversely affect the electrochemical reaction rate at the anode when employed in the higher concentrations of the concentration range hereinafter set forth. In general any surfactant can be used which does not adversely affect the intended half cell reaction while extending the effective reaction area.

The concentration of the surfactant in the electrolyte solution can vary over a wide range. If the chemical composition of the surfactant is such that it competes with the regular organic fuel for electrochemical oxidation at the anode it is preferred to operate with low concentrations of surfactants which are either periodically or continuously replaced. The concentration of surfactant in the electrolyte solution will ordinarily be above about .001 wt. percent, preferably in the range of about 0.001 to 1.0, more preferably 0.01 to 0.6 and most preferably about 0.1 to 0.3 wt. percent.

A particularly effective surfactant for use in this invention is an ethylene oxide adduct of isooctylphenol containing about 9 to 10 moles ethylene oxide per mole of isooctylphenol.

In a second preferred embodiment of the invention, the nonionic surfactant is a compound in accordance with the aforelisted type formula $$RO(CH_2CH_2O)_nH$$

wherein the hydrophobic or lipophilic portion of the molecule is an aliphatic alcohol having about 8 to 30, preferably about 12 to 18, carbon atoms per molecule. The amount of ethylene oxide employed will vary somewhat in accordance with the number of carbon atoms in the hydrophobic portion of the molecule. Employing tridecyl alcohol as an illustrative example of the hydrophobic groups, the best results are obtained when this is combined with about 12 to 20, preferably about 14 to 16, ethylene oxide units per molecule.

In the accompanying drawing, there is illustrated a schematic side view of a simple fuel cell suitable for illustrating the invention. Referring now to the drawing, inside vessel 1 is positioned cathode 2 and anode 3 which are electrically connected by wires 4 and 5 and resistance means 6 which is symbolic of any appliance or device utilizing a direct electric current for power. Fuel inlet conduit 7 provides means for admitting a fuel gas, e.g. ethane, butene-2, etc., into a fueling compartment 8 which communicates with porous anode 3 and has exhaust means via fuel outlet conduit 9. Oxidant inlet conduit 10 provides means for admitting a fluid oxidant, e.g. oxygen, air, etc., into oxidant feed compartment 11 which communicates with cathode 2 and has exhaust means via oxidant outlet conduit 12. Between cathode 2 and anode 3 is an electrolyte compartment 13, shown here partially filled with an aqueous fuel cell electrolyte, e.g. $H_2SO_4$, KOH, etc. Electrolyte compartment 13 is equipped here with an exhaust means via outlet conduit 14. Conduits 14 and 9 both serve as outlets for vaporous products, e.g. $CO_2$, formed at anode 3 when the cell is in operation. The electrodes are here shown to be porous plates through which the fuel and oxidant pass to achieve contact with the liquid electrolyte which also achieves some penetration of the electrode pores. This invention, however, is not restricted to cells employing porous anode and thus is applicable where a solid sheet or a wire screen electrode is employed. It is to be understood that the cell shown is illustrative only and that the invention is applicable to cells in general which employ a gaseous organic reactant which contains both carbon and hydrogen in its molecular structure. Thus, for example, the invention is particularly applicable to cells which have an ion-permeable or ion-exchange membrane as an electrolyte partition to separate fuel from the cathode. It is also applicable to cells which employ a liquid oxidant such as nitric acid at the cathode.

The components of the electrodes in all the modifications described above are well known and need not be described in detail. Suitable catalysts, electrolytes, oxidants and fuels for cells employing gaseous fuels have been described often in the literature and need not be repeated here since this invention involves only the addition of small amounts of the nonionic surfactants discussed to conventional electrolytes and the operation of conventional fuel cells with such electrolyte solutions.

The surfactants employed serve an additional function toward increasing the efficiency of the cell in that they facilitate the escape of carbon dioxide bubbles formed at the anode surface by lowering the surface tension of the electrolyte.

The invention will be more fully understood from the following examples which are for purposes of illustration only and should not be construed as limitations upon the true scope of the invention as set forth in the claims.

*Example 1*

Several surface-active agents were evaluated for effect on the electrochemical oxidation of cis-butene-2 supplied in gas phase to a sulfuric acid electrolyte and a platinum electrode.

The electrolyte employed was 3 molar sulfuric acid. The reaction was carried out at 75° F. and atmospheric pressure in all tests. The anode, i.e. fuel electrode, was a platinum wire having platinum black electrodeposited thereon in an amount equal to 6 grams/sq. ft. of superficial electrode surface. The cis-butene-2 gas was passed over the surface of the electrolyte so as to contact the fuel electrode. Currents were measured for heights of the electrode above the liquid surface with the lower part of the electrode at all times immersed in the electrolyte to a depth sufficient to obtain maximum below-surface reaction.

The effective reaction height above the mean upper surface of the electrolyte was determined by placing the electrode beneath the surface of the electrolyte and moving it upward out of the electrolyte in measured increments.

The amount of surfactant employed in each run was 0.1 wt. percent. The greatest improvement obtained was with two nonionic surfactants. One, a tridecyl alcohol ethylene oxide adduct having an oxide to alcohol mole ratio of 15/1 increased the height of the effective reaction area above the electrolyte mean level more than threefold while the total current produced via reaction below the electrolyte surface was more than doubled indicating a proportional increase in reaction area there also. The other a 9–10 mole ethylene oxide adduct of isooctylphenol increased the height of the effective reaction area above the electrolyte mean level while increasing the rate of reaction in amps./ft.$^2$ based on effective reaction area above the electrolyte mean level.

Thus all surfactants tested increased the reaction area although some produced a decrease in reaction rate in such area.

The results of this and other representative tests are set forth in greater detail in the following table:

of surface-active agents are discussed in detail in "Textile Chemicals and Auxiliaries With Special Reference to Surfactants," 2nd Edition (1957), Reinhold Publishing Corp., New York, New York. See particularly pages 302–319.

What is claimed is:

1. In the operation of an electrochemical cell employing an aqueous electrolyte and an electrode partially immersed in said electrolyte so as to admit of passing a gaseous combustible fuel into dual contact with said electrode and said electrolyte thereby establishing an area of electrochemical reaction wherein the said fuel is oxidized, the improvement which comprises introducing into said electrolyte a nonionic surface-acting agent in an amount sufficient to enlarge said area and insufficient to reduce the total electrochemical reaction included in said electrode.

2. In the operation of an electrochemical cell in accordance with claim 1 the use of an ethylene oxide adduct of an aliphatic alcohol as said surface-active agent.

3. In the operation of an electrochemical cell in accordance with claim 1 the use of an ethylene oxide adduct of an alkyl substituted phenol as said surface-active agent.

4. In the operation of an electrochemical cell in accordance with claim 1 wherein said surface-active agent comprises about 0.001 to 1.0 wt. percent of the resulting electrolyte solution.

5. In the operation of an electrochemical cell employing an aqueous electrolyte and an electrode partially immersed in said electrolyte so as to admit of passing a gaseous hydrocarbon into dual contact with said electrode and said electrolyte thereby establishing on the surface of said electrode an area of electrochemical reaction

TABLE I.—EFFECT OF SURFACTANTS IN ELECTROLYTE ON GAS PHASE REACTION OF BUTENE

| Surfactant | Inches of electrode utilized in reaction above electrolyte surface | Current derived from gas phase at 0.9 volt polarization vs. St. $H_2$ | | Current derived from liquid phase at 0.9 volt polarization vs. St. $H_2$, Amps.$\times 10^3$ |
|---|---|---|---|---|
| | | Amps.$\times 10^3$ | Amps./Ft.$^2$ | |
| None | 0.21 | 0.40 | 2.19 | 0.27 |
| 9 moles ethylene oxide adduct of 1 mole tridecyl alcohol | 0.45 | 0.18 | 0.46 | 0.28 |
| 12 moles ethylene oxide adduct of 1 mole tridecyl alcohol | 9.48 | 0.77 | 1.84 | 0.53 |
| 15 moles ethylene oxide adduct of 1 mole tridecyl alcohol | 9.65 | 1.24 | 2.19 | 0.58 |
| 30 moles ethylene oxide adduct of 1 mole tridecyl alcohol | 0.32 | 0.29 | 1.04 | 0.26 |
| Tridecyl dimethyl benzyl ammonium chloride | 0.37 | 0.15 | 0.46 | 0.10 |
| 9–10 moles ethylene oxide adduct of isooctylphenol | 0.32 | .70 | 2.50 | 0.41 |
| 7–8 moles ethylene oxide adduct of isooctylphenol | 0.22 | 0.30 | 1.56 | 0.44 |

*Example 2*

Further tests are conducted as in Example 1 with the same surfactants under the same conditions except that 0.001 wt. percent surfactant is employed in one series of tests, 0.01 wt. percent surfactant in a second series of tests, 0.5 wt. percent in a third series of tests and 1.0 wt. percent in a fourth series of tests. Improvement in reaction height above the electrolyte mean surface is obtained in all cases. The loss in reaction rate with certain surfactants in Example 1 is reduced by the employment of lower concentrations of surfactant.

*Example 3*

Further tests are conducted as in Example 1 using a variety of cationic and anionic surfactants which are representative of the types hereinabove set forth. Improvement in reaction area is achieved in each test.

The terms "adduct" and "condensate" are to be considered interchangeable herein.

The term "surfactant," the properties and the effects wherein said hydrocarbon is oxidized with release of electrons to said electrode, the improvement which comprises admitting to said electrolyte an ethylene oxide adduct of an aliphatic alcohol wherein the ratio of the number of moles of ethylene oxide in the hydrophilic portion of the adduct to the number of carbon atoms in the lipophilic portion of the adduct is in the range of about 12 to 20/13.

6. In the operation of an electrochemical cell in accordance with claim 5 wherein said adduct is an ethylene oxide adduct of tridecyl alcohol containing about 12 to 15 moles of ethylene oxide per mole of alcohol.

7. In the operation of an electrochemical cell employing an aqueous electrolyte and an electrode partially immersed in said electrolyte so as to admit of passing a gaseous hydrocarbon into dual contact with said electrode and said electrolyte thereby establishing on the surface of said electrode an area of electrochemical reaction wherein said hydrocarbon is oxidized with a release of electrons to said electrode, the improvement which comprises admitting to said electrolyte an ethylene oxide condensate of nonyl phenol containing about 9 to 10 moles ethylene oxide per mole of said phenol.

8. A fuel cell comprising a housing, a porous oxidant electrode, an oxidant compartment adjacent said oxidant electrode, a porous fuel electrode, a fuel compartment adjacent said fuel electrode, and an electrolyte compartment defined between said oxidant and fuel electrodes, an aqueous electrolyte within said electrolyte compartment containing an operative amount of surface active agent, and means for feeding fuel and oxidant to the electrodes in their respective compartments, with said fuel and oxidant being maintained separated from the electrolyte upon introduction into said electrodes.

9. A fuel cell as defined by claim 8 wherein said surface active agent is cationic.

10. A fuel cell as defined by claim 8 wherein said surface active agent is anionic.

References Cited by the Examiner

UNITED STATES PATENTS 2,925,454   2/1960   Justi et al. _____ 136—86

WINSTON A. DOUGLAS, *Primary Examiner.*

JOHN R. SPECK, JOHN H. MACK, *Examiners.*

H. FEELEY, *Assistant Examiner.*